J. R. PILE.
GRADING MACHINE.
APPLICATION FILED JULY 22, 1919.
1,340,497.
Patented May 18, 1920.
3 SHEETS—SHEET 1.
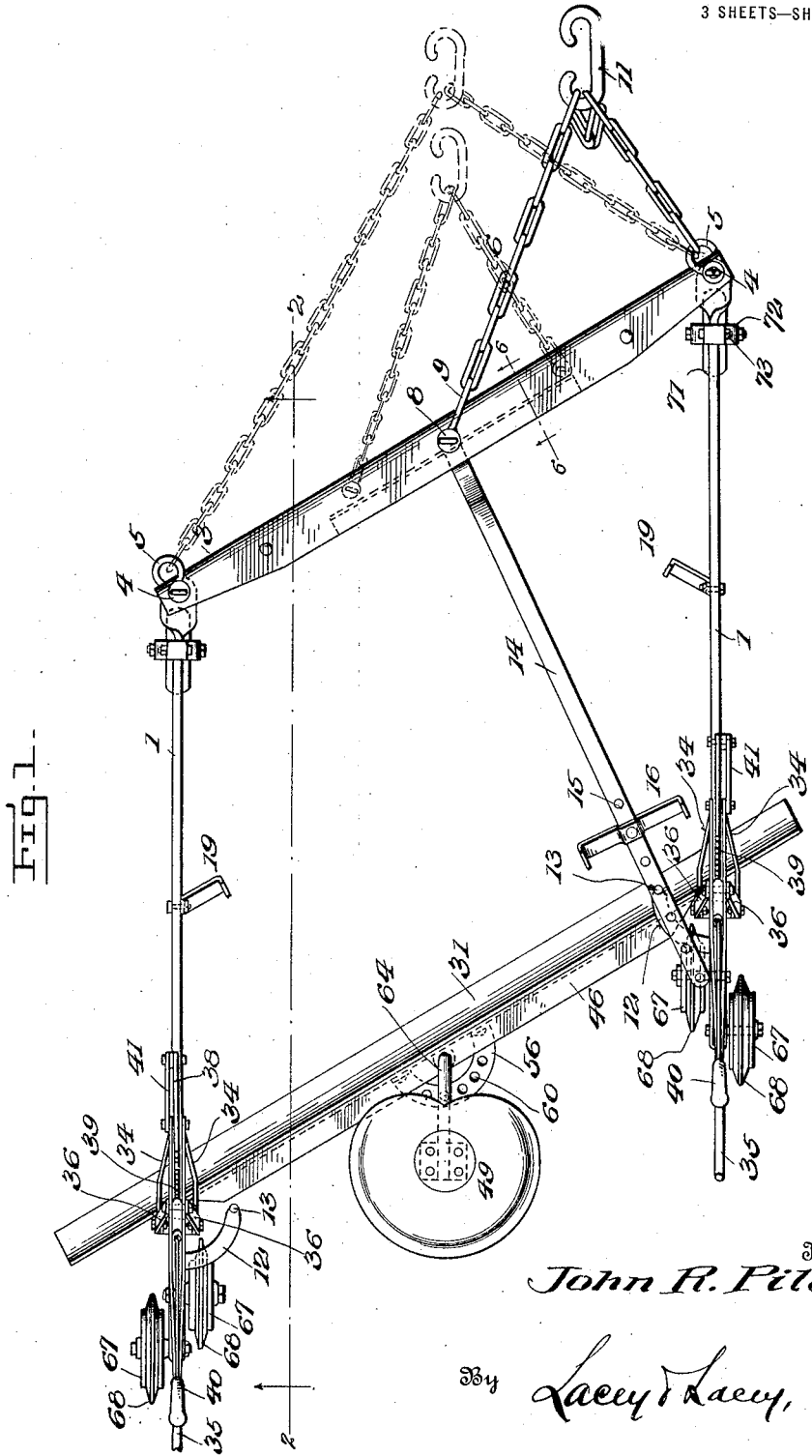
Inventor
John R. Pile
By Lacey & Lacey,
Attorneys

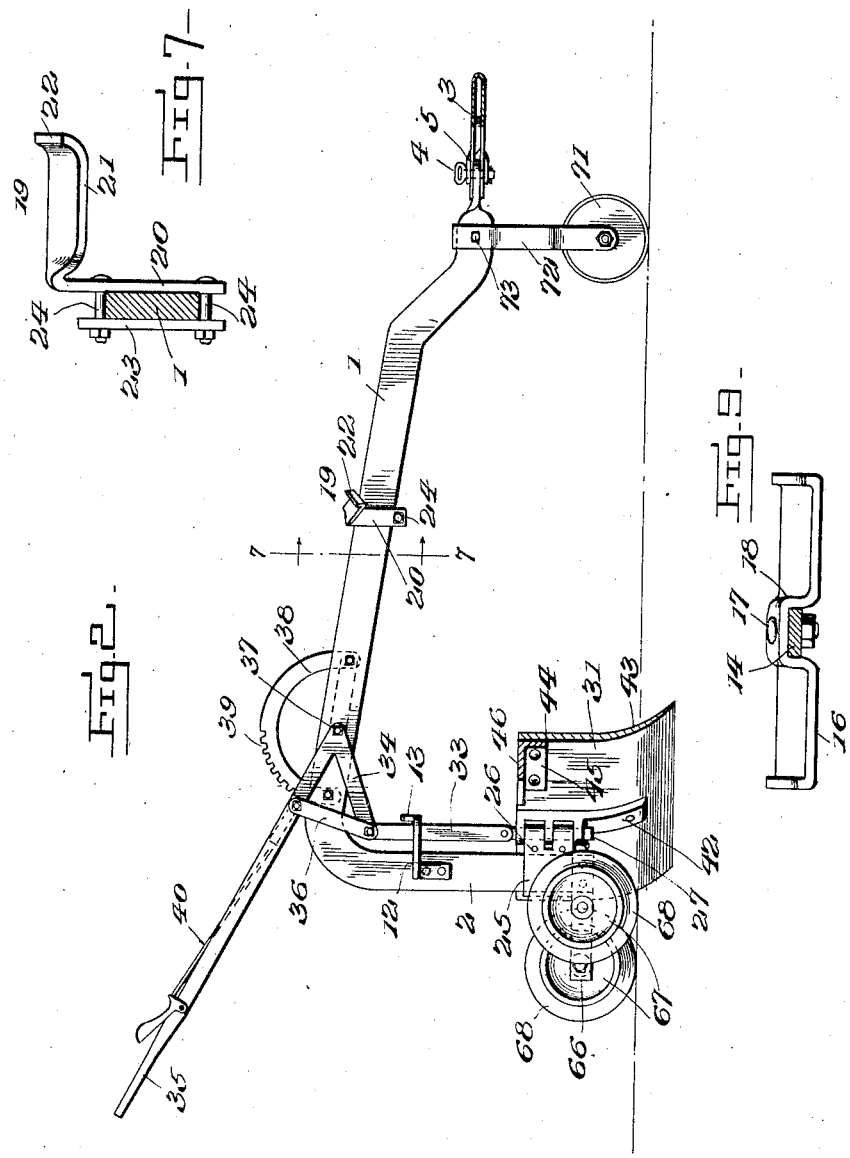

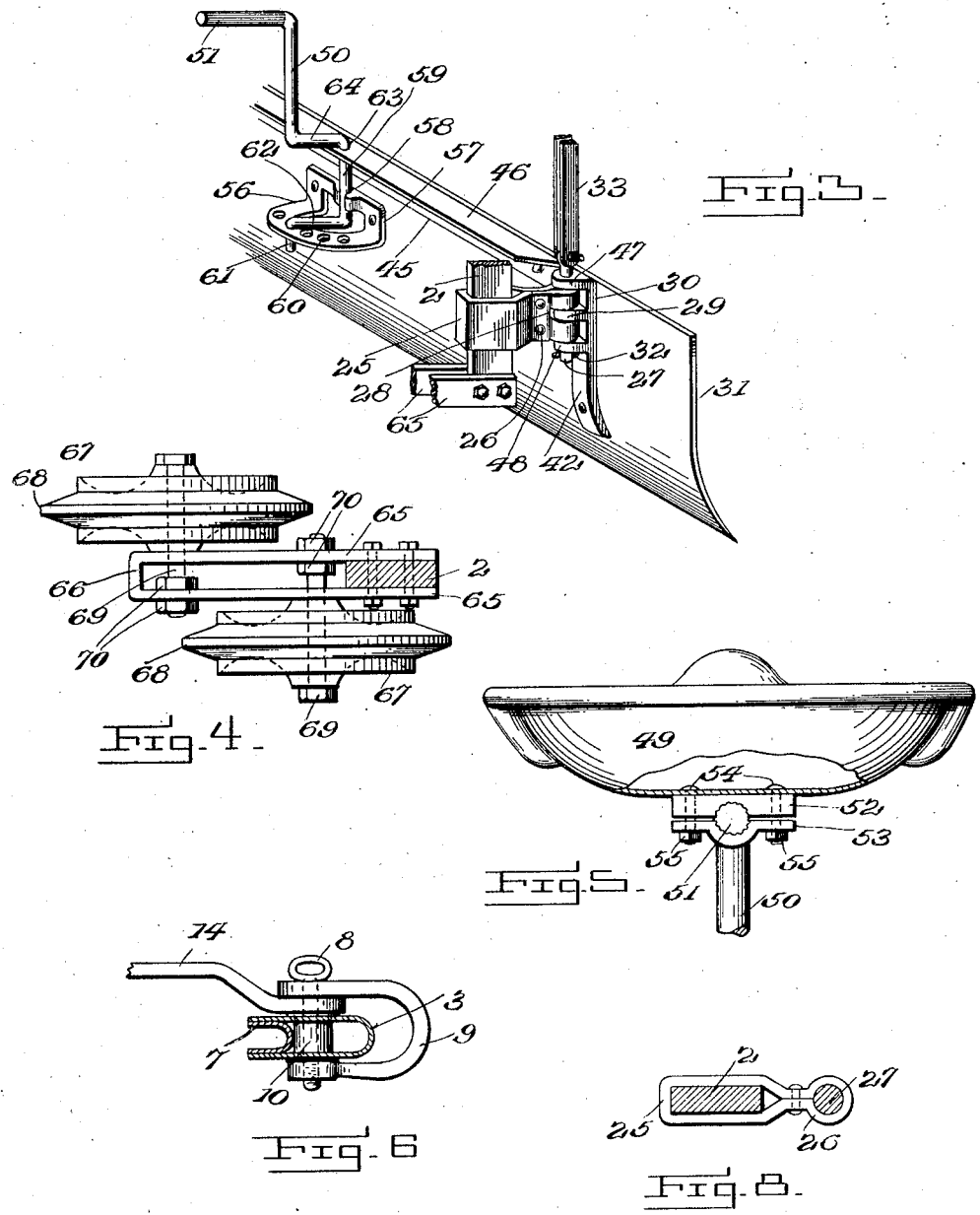

UNITED STATES PATENT OFFICE.

JOHN R. PILE, OF OWENSBORO, KENTUCKY, ASSIGNOR TO INTERNATIONAL FARM IMPLEMENT COMPANY, OF OWENSBORO, KENTUCKY.

GRADING-MACHINE.

1,340,497.  Specification of Letters Patent.  Patented May 18, 1920.

Application filed July 22, 1919. Serial No. 312,487.

*To all whom it may concern:*

Be it known that I, JOHN R. PILE, a citizen of the United States, residing at Owensboro, in the county of Daviess and State of Kentucky, have invented certain new and useful Improvements in Grading-Machines, of which the following is a specification.

This invention has for its object to improve and simplify the construction of grading and ditching machines. The invention seeks to provide a grading machine of light draft which will be held to its work without excessive strain upon the draft animals or requiring severe labor upon the part of the operator or driver, and the invention also seeks to provide a machine which may be quickly and easily converted into a drag when so desired.

The invention is illustrated in the accompanying drawings and will be hereinafter fully described, the novel features being subsequently pointed out in the appended claims.

In the drawings—

Figure 1 is a plan view of a grading machine embodying my present improvements;

Fig. 2 is a longitudinal section on the line 2—2 of Fig. 1;

Fig. 3 is a detail perspective view of the blade and several of the parts immediately adjacent the same;

Fig. 4 is a plan view of the rear rollers and the support for the same, the standard being shown in horizontal section;

Fig. 5 is a detail view of the seat and its support,

Fig. 6 is a detail section on the line 6—6 of Fig. 1;

Fig. 7 is a detail section on the line 7—7 of Fig. 2;

Fig. 8 is a detail horizontal section of the sliding sleeve by which the blade is connected with the standard.

Fig. 9 is a detail view of the double foot rest.

In carrying out my present invention, I employ a pair of beams 1 which are disposed in an inclined position, as shown most clearly in Fig. 2, so that their front ends will be lower than their rear ends and clearance for the dirt turned up by the blade will be thereby provided. The rear ends of the beams are turned downwardly and merge into standards 2, while the front ends of the beams are twisted so as to enter within a draft bar 3 at the ends of the same, said draft bar being U-shaped in cross section. The bolts or pins 4, by which the ends of the beams are secured to the ends of the draft bar, also form means for supporting clevises 5 in which an end of a draft chain 6 may be engaged. Between its ends, the draft bar 3 is reinforced by a bar 7 of similar shape but less dimensions fitting between the rear free edges of the draft bar and secured thereto by welding or otherwise. At the center of the draft bar 3, I insert through the same a pin or bolt 8 which carries a clevis 9 to which one end of the draft chain 6 is attached and around the bolt or pin 8 a sleeve 10 is fitted to reinforce the draft bar and prevent buckling thereof under the strain transmitted thereto through the pin or bolt 8. The sleeve 10 will preferably extend through the branches of the draft bar and be provided at its ends with flanges which will engage the outer faces of said branches and the member 8 will preferably be threaded into the lower end of the clevis 9 as will be readily understood upon reference to Fig. 6. A double hook 11 is provided to connect a whiffletree or similar device with the draft chain, one terminal of said hook being engaged in a ring or other device on the whiffletree, while the other terminal of the hook 11 is engaged through any two links of the draft chain 6. The draft may, therefore, be applied in line with the greatest resistance upon the blade so that the twisting of the blade and skidding of the machine while at work will be avoided without increasing the strain upon the draft animals and in fact imposing less strain upon them than is the case with most machines now in use inasmuch as they will be relieved of the greater portion of the objectionable side draft. Obviously, the machine may be set to run at any desired angle to the draft and the blade may be disposed to turn the dirt in either direction. The chain will be engaged in one or the other of the clevises 5 accordingly as the blade is set to turn the dirt to one or the other side of the line of travel.

The arrangement of the draft chain described in detail above is illustrated in full lines in the drawing, and I have also shown by dotted lines other arrangements which may be employed. It will be noted that one arrangement shows the ends of the draft chain both disposed at the ends of the draft bar while the other dotted arrangement shows the ends of the chain disposed at opposite sides of the center of the bar but between the center and the ends thereof. Any one of the arrangements may be used as may be found most desirable under the existing conditions. The arrangements shown in dotted lines have the advantage over the first-described arrangement of not requiring either end of the chain to be shifted when the blade is reversed as it is sufficient to shift the hook 11 to the line of the load.

Upon the inner side of each standard 2 is a bracket 12 having an upstanding pin or stud 13 at its front end, the bracket being extended inwardly and forwardly so that the said pin or stud will be spaced from the standard. A locking brace bar 14 is provided to hold the draft beam or bar 3 and the blade in the angle in which it has been set and the said locking bar or brace is pivotally mounted at its front end upon the pin or bolt 8 disposed at the center of the draft beam and is provided in its rear portion with a longitudinal series of openings 15 any one of which may be engaged over the pin or stud 13. It will thus be seen that by shifting the brace or locking bar 14 to one or the other side of the machine and engaging the proper opening 15 over the stud 13, the brace may be set at any desired angle so as to hold the draft beam at any desired angle to the line of travel and effectually resist the tendency of the parts to move out of the set position under the working strain. Any convenient retaining device may be fitted in or on the upper end of the stud 13 over the brace 14 so as to prevent accidental separation of the parts. A double foot rest 16 is mounted upon the brace 14 and is secured thereto by a bolt 17 inserted through one of the openings 15 in the brace or locking bar, the central portion of the foot rest being formed into a seat 18 which will fit over the brace and engage the sides of the same so as to prevent pivotal movement of the foot rest upon the bolts 17. A foot rest 19 is also provided upon each beam 1 and the said foot rest 19 consists of a flat bar bent to provide a standard 20 fitting against the inner side of the beam 1 and an upper foot-receiving portion 21 extending laterally from the said standard 20, the foot portion having its end upturned, as shown at 22, to prevent slipping of the foot and being disposed at an angle so as to support the foot in a comfortable position. A clamping plate 23 is provided against the outer side of the beam 1 and clamping bolts 24 are inserted through the standard 20 and the plate 23 above and below the beam 1 so as to firmly secure the foot rest to the beam 1 at any desired point along the same. It will thus be readily seen that a rest for each foot of the driver is provided in all positions of the beams and of the locking brace. To reverse the blade, the brace 14 is released and the hook 11 shifted to the proper point of the draft chain. Then, when the team is driven forward, the blade will be automatically reversed, and, after it has reached the desired angle, the brace 14 will be properly set to maintain the adjustment.

Upon each standard 2 is slidably mounted a sleeve 25 which is provided with an extension 26 at its front side, said extension being formed with a vertical bore to receive a king pin 27 and a central horizontal notch 28 to receive the central lug 29 on a bracket 30 which is secured to the rear side of the blade 31. The lower end of the king pin 27 is fitted with a cotter pin or other retaining member 32 so that withdrawal of the king pin from the bracket and the sleeve will normally be prevented. To the upper end of the king pin is pivoted the lower ends of a pair of links 33 which extend upwardly and are pivoted to the lower arm 34 of a lever 35, links 36 being secured to the main portion of the lever 35 and the end of the arm 34, as shown clearly in Fig. 2, so that a strong structure will be provided. The lever 35 is forked in its forward portion and is fulcrumed upon the beam 1 by a bolt 37 concentric with a segment 38 secured to the beam and provided in the rear portion of its upper arcuate edge with a plurality of notches 39 to be engaged by a latch 40 carried by and housed within the lever so as to hold the parts in a set position. A brace 41 is secured to the outer side of the beam 1 and extends between the forward end of the segment 38 and the fulcrum of the lever so as to reinforce the beam and aid in preventing buckling of any of the parts under the weight of the blade and the strain imposed thereon when adjusting the blade. The bracket 30 is provided with an extension 42 which is riveted or otherwise secured rigidly to the back of the blade and is shaped to properly fit against the curved portion of the blade, it being noted upon reference to Figs. 2 and 3 that the blade is dished or curved along one longitudinal edge, as shown at 43, while along its other edge it is flat, as shown at 44. The flat portion of the blade is normally the upper portion thereof and to reinforce the blade, I secure to the rear side thereof at the upper edge thereof a brace in the form of an angle bar having its vertical web 45 riveted or otherwise rigidly secured to the blade and its horizontal web 46 projecting rearwardly from the blade. This brace will preferably extend the full length of the blade between the brackets 30 thereon. The said brackets 30 are constructed with rearwardly projecting lugs 47 and 48, similar in all respects to the lug 29 and disposed respectively above and below the said lug. The king pin 27 passes through all of said lugs and through the forward extension 26 of the sleeve 25 with the lug 47 projecting over said extension and the lug 48 projecting under the same, as clearly shown in Figs. 2 and 3. Pivotal movement of the blade relative to the sleeve is thus permitted and the blade may be adjusted vertically by manipulation of the lever 35 in a well-known maner, the sleeve 25 riding on the standard 2 in the vertical adjustment of the blade so that the blade will be firmly supported upon the standard in all its positions. If it be desired to invert the blade, the retaining device 32 is removed and the levers 35 are then swung forwardly so as to withdraw the king pin 27 from the bracket 30 and the sleeve 25, after which the blade may be inverted and the king pin returned to its operative position. It will be understood that when it is desired to reduce the surface of a road by cutting off ridges therein the curved sharpened edge of the blade will be disposed against the ground, while if the device is to be used simply as a drag to impart smoothness to the surface of the road the flat faced portion of the blade will be disposed lowermost and the curved portion of the blade will then project forwardly so as to turn back onto the surface any surplus dirt which may tend to ride up the blade.

The seat 49 is supported on a standard 50 mounted upon the rear of the blade and at the center of the same, the upper extremity of the standard being turned horizontally rearward, as shown at 51, and being corrugated to fit between and be engaged by the similarly corrugated opposed seats of the clamping plates or blocks 52, 53 which are secured against the upper and lower surfaces of the corrugated support 51 by bolts 54 and nuts 55 on the lower ends of said bolts. The clamping plate 52 is disposed directly against the under side of the seat and bears upon the upper side of the support 51 while the plate 53 is mounted upon the lower ends of the bolts and has its central portion dished to properly engage the support 51 and is turned against the said support and toward the plate 52 when the nuts 55 are turned home. This manner of mounting the seat permits it to be easily adjusted so that it will remain in a horizontal position notwithstanding the machine may be operated upon a terrace or across a surface having a pronounced grade. The corrugations may be omitted, if desired, and a set screw mounted in the lower clamping plate to bear against the support 51 to hold the seat against turning.

The standard 50 is carried by a rest 56 extending rearwardly from the blade and having its forward portion disposed vertically, as shown at 57, to be secured to the blade by rivets or otherwise. The upturned portion 57 of the rest is provided centrally with a notch or socket 58 to receive the portion 59 of the standard and the rest 56 is preferably in the form of a semi-circular bar concentric with the socket or notch 58 and provided with a plurality of openings 60 in any one of which the finger 61, forming the terminal of the standard, may be engaged. It will be noted that the finger 61 is at the outer end of an arm 62 extending laterally from the portion 59 of the standard and the said portion 59 passes through an opening 63 in the web 46, the main portion of the standard 50 being connected with the portion 59 by a radial arm 64 which is parallel with the arm 62 and in the same vertical plane as the same. By raising the standard sufficiently to withdraw the finger 61 from an opening 60 and then turning the standard pivotally about the portion 59, the seat may be shifted as may be necessary to accommodate the various angular adjustments of the machine and the finger 61, of course, will be engaged in the proper opening 60 to hold the seat in its adjusted position. If it be desired to remove the seat entirely, the standard may be raised to bring the arm 62 against the web 46 and then turned so that the said arm and the finger 61 may be wormed or threaded through the opening 63, and the said opening should be of such a diameter that this manipulation of the standard will be feasible while at the same time rocking of the standard relative to the blade when the machine is in use will be prevented. The members 56, 61 and 62 may be dispensed with and an ordinary set screw mounted in the wall of the socket 58 to bear against the terminal 59 and hold the standard against turning in an obvious manner.

To the lower end of each standard 2, I secure the front extremities of the side members 65 of a horizontally disposed U-shaped frame 66 and each frame 66 forms the support for a pair of rollers 67 disposed one in advance of the other. As shown in Fig. 4, the rollers are also disposed at opposite sides of the frame 66 and each roller is constructed with a central angular flange or rib 68 whereby it may more readily engage in the ground and hold the machine to its work and prevent skidding. The axle of each roller consists of a heavy bolt 69 which passes through the center of the roller and also through both side members 65 of the frame 66, lock nuts 70 being fitted upon the bolt and arranged to bear against the opposite faces of that side member 65 more remote from the roller. I thus support the rollers firmly by a very simple, strong and inexpensive construction. The front end of each beam 1 is supported by a roller 71 which is mounted between the lower ends of an inverted U-shaped standard or strap 72 which has its upper portion fitted over the beam adjacent the front end thereof and secured thereto by a bolt 73 in an obvious manner.

It may sometimes, be preferred to employ a single wide roller mounted between the sides of the U-shaped frame, and this arrangement may be used without detracting from the efficiency of the machine. It is thought the many advantages of my improved machine will be readily understood from the foregoing description, taken in connection with the accompanying drawings, and it is to be understood that minor changes may be made in the details of construction without departing from the principles or scope of the invention as the same is defined in the following claims.

Having thus described the invention, what is claimed as new is:

1. In a grading machine, the combination of a pair of beams, a blade supported by and between the beams, a draft bar pivotally attached to the front ends of the beams and extending between the same, brackets carried by the rear ends of the beams, and a locking brace pivoted at its front end to the draft bar at the center thereof and adapted at its rear end to be engaged over either one of said brackets.

2. In a grading machine, the combination of a pair of beams, a blade carried by and extending between the beams, brackets carried by the inner sides of the beams and provided at their forward ends with upstanding studs, a draft bar pivoted at its ends to the front ends of the beams, and a locking brace pivoted at its front end to the beam at the center thereof and provided in its rear portion with a plurality of openings to be engaged over the stud on one of said brackets.

3. In a grading machine, the combination of a pair of beams, a blade carried by the beams, a hollow draft bar having its ends fitted over and pivoted to the front ends of the beams, clevises at the ends of said draft bar and at the center of the same, and a draft chain attached at one end to the clevis at the center of the draft bar and at its other end to the clevis at one end of the draft bar.

4. In a grading machine, the combination of a pair of beams, a blade carried by and between the beams, a hollow draft bar pivoted at its ends to the end of the beams, and a reinforcing plate doubled upon itself and secured rigidly in the draft bar between the rear edges thereof and at the center of the same.

5. In a grading machine, the combination of a pair of beams, a blade carried by and between the beams, a draft bar pivoted at its ends to the front ends of the beams, a foot rest adjustably secured upon each beam at the inner side of the same, a locking brace pivoted at its front end to the draft bar at the center of the same and adapted at its rear end to be engaged with either beam, and a double foot rest carried by said locking brace and extending from each side thereof.

6. In an earth grader, the combination with an invertible blade, of a rest on the rear side of said blade provided with a socket at its center against the blade and provided with a plurality of openings disposed in an arcuate series concentric with said socket, a standard having a portion adapted to rest in said socket and support a seat, and an arm projecting from the portion engaging in the socket and provided at its end with a finger to engage in one of said openings.

7. In an earth grader, the combination with a beam, and a standard at the rear end of the beam, of a sleeve slidably mounted on the standard, a bracket adapted to engage with the front end of said sleeve to move vertically therewith, a blade secured and carried by said bracket, a vertically disposed king pin pivotally connecting the sleeve and the bracket for relative horizontal movement, a lever fulcrumed upon the beam and having a rearwardly and downwardly projecting arm, links connecting said arm with the upper end of the king pin, and links connecting the end of the arm with the major portion of the lever.

8. In an earth grader, the combination of a standard, a U-shaped frame having its side members rigidly secured to the lower end of the standard and projecting rearwardly therefrom, rollers disposed at the opposite sides of said frame, bolts pivotally supporting said rollers and extending horizontally through the side members of the frame, and lock nuts on each of said bolts embracing the side of the frame remote from the roller carried by the respective bolt.

In testimony whereof I affix my signature.

JOHN R. PILE. [L. S.]